UNITED STATES PATENT OFFICE.

EDWARD ELWAY FREE, OF CARMEL, CALIFORNIA.

FERTILIZER AND ITS USE.

1,409,126.  Specification of Letters Patent.  Patented Mar. 7, 1922.

No Drawing.   Application filed May 8, 1916.  Serial No. 96,222.

*To all whom it may concern:*

Be it known that I, EDWARD ELWAY FREE, a citizen of the United States of America, and a resident of Carmel, county of Monterey, State of California, have invented certain new and useful Improvements in Fertilizers and Their Use, of which the following is a specification.

The invention has for its object the utilization of the stimulating effect on plant growth displayed under the described conditions by certain metallic and other elements not heretofore believed to be utilizable to a material extent by plants as nutrient materials and not commonly employed as fertilizers.

The elements commonly used as fertilizers are potassium, phosphorous, nitrogen and calcium. These and a few other elements are believed to be employed by plants as food materials. It has long been known that certain other elements, notably the so-called heavy metals, such as copper, zinc and mercury, are not only not utilized by plants as food materials, but are actually poisonous if present in sufficient concentration in the soil or other culture medium from which the plant is drawing its sustenance. However, it has been found by numerous previous investigators that certain ones of these poisonous elements, if applied to plants in concentrations less than the concentrations found to be poisonous, have, in some cases, a stimulating effect upon growth. For instance, zinc salts applied to wheat plants in concentrations too low to be poisonous have been found, in some cases, to cause a greater and more rapid growth of the wheat than occurred in control cultures to which no zinc salts were applied. Similar stimulations have been reported in definite cases as resulting from the application of compounds of boron, copper, iron, lead, manganese, mercury, uranium, vanadium and probably other elements. In at least two cases (boron and manganese) it has been attempted to use these materials as commercial fertilizers.

So far as I am aware, the use of these materials as fertilizers has not been successful commercially, for the reason that the results, both in field tests and laboratory tests, have been erratic and not uniform. In certain cases, the application, for instance, of salts of zinc, has been stimulating. In others it has been without effect or actually poisonous. It follows that actual agricultural use of these stimulating materials has been dangerous and has not been attempted on a wide commercial scale.

As a result of extensive investigations, I have discovered that the variable and erratic character of the results which have been obtained with these stimulating materials has been due to the fact that the concentrations in the soil or other culture medium at which each of these materials is respectively stimulating or poisonous are variable with, and determined by, the amounts of other water-soluble materials present in the soil or other culture medium, including among these other water-soluble materials compounds of the well-known plant nutrient elements, namely, potassium, phosphorous, nitrogen, and calcium. For instance, the application to a so-called "poor" soil, containing only very small amounts of the main nutrient elements, of 100 parts per million of zinc in the form of soluble salts of that element is severely poisonous to plants growing in the soil. On the other hand, the application of the same quantity of zinc to plants growing in a so-called "good" soil, containing ample supplies of nutrient elements, is stimulating to the plants. As used in this specification, a "poor" soil may be considered as a soil the soil-solution of which contains less than three grams per liter of the total of nutrient salts; that is to say of soluble compounds of potassium, phosphorous, nitrogen, calcium and magnesium. A "good" soil may be considered as a soil the soil-solution of which contains a total of more than three grams per liter of the same compounds.

As another example it is found that for loam soils of normal chemical character the concentration of copper in the soil-solution necessary to produce the desired stimulant effect, varies with the total concentration of nutrient salts in the soil-solution as follows: If the total concentration of nutrient salts expressed in grams per liter is one gram, the required concentration of copper to produce the stimulant effect is 0.0002 gram per liter. If the total nutrients equal three grams per liter, the stimulant concentration of copper is 0.0004 gram per liter. If the total nutrients equal five grams per liter, the stimulant concentration of copper is 0.0004 gram per liter. If the total nutrients equal eight grams per liter, the stimulant concentration of copper is 0.0005 gram per liter. If the total nutrients equal ten grams per liter, the stimulant concentration of copper is 0.0009 gram per liter.

In general terms and expressing the effect of these elements upon plant growth as a function of the concentration of the elements in the soil or other nutrient medium in which the plant is growing, there are two concentrations which are important as determining the effect of the elements concerned. These are, first, the concentration at which stimulation occurs, and, second, the concentration at which the element begins to be poisonous. The first or stimulating concentration is always lower than the second or toxic concentration. My discovery is that both of these critical concentrations are variable in response to the conditions surrounding the plant and especially in response to the amount and composition of the usual nutrient materials (compounds of potassium, phosphorous, nitrogen and calcium) present in the nutrient medium and available to the plant. The practical value of this invention lies in the fact that if the amount of the stimulating element supplied to the soil or other culture medium is properly adjusted to the amounts of the nutrient elements also present it is possible to make certain of obtaining the stimulating effect of the added element rather than its toxic effect or no effect at all. It becomes possible, therefore, to use these stimulating elements as commercial fertilizers with assurance that the stimulating effect will actually be realized and that no injurious or poisonous effect will occur. It is necessary only to determine the amounts of the usual nutrient elements which are available to the plant and to calculate the concentration of the stimulating element or elements to be used, which concentration is proper to assure the stimulating effect in the presence of the amounts of the nutrients determined to be present.

This assurance as to the proper relation between the concentration of the added stimulating element or elements and the concentrations of the nutrient elements already present can be obtained in three ways. In some cases it is possible to analyze the soil or other culture medium to be employed, discover the concentrations of the nutrient materials which will be present, and calculate from this the concentration of the stimulating element or elements which will give the desired effect, this calculation being made on the basis of previous experimentation which has determined the concentration of the stimulant element proper to be employed with the discovered concentrations or with any specified concentrations of the nutrient elements. In other cases it is possible to make laboratory, greenhouse or field tests with the particular soil or other culture medium to be employed and with the stimulating element or elements being considered, the result of these tests being the determination of the concentration of the stimulating element or elements proper to be used with the actual soil or other culture medium to be employed. In other cases it is possible to assure the presence of the nutrient elements and the stimulating elements in proper mutual concentrations by adding them to the soil at the same time, and in such ratio to each other as is found to be satisfactory.

Although the concentration of the stimulating element or elements proper to be used may be determined in the three ways stated, I would not be understood as limiting my invention to any one or all of these three ways of determining this proper concentration. I understand my invention as including the use of the stimulating element or elements in this proper concentration, regardless of how this proper concentration is determined. I would state, also, that although the concentration of the nutrient elements in the soil or other culture medium is ordinarily the main factor effecting and determining the concentration of the stimulating element or elements proper to be used, it is not necessarily the only factor effecting this concentration. In certain cases the nature of the plant, the physical character of the soil, the number and nature of the soil bacteria, the climatic situation, and possibly other factors, will have effects upon the concentration of the stimulating element or elements proper to be used. I understand that the possible necessity of taking account of these factors in deciding upon the concentration of the stimulating element or elements proper to be used is contemplated in my invention. It is well known that under ordinary conditions in settled regions, all of these factors and their effects can be evaluated in advance by those skilled in the art of scientific agriculture.

I have discovered further that, when the concentration of the stimulating element or elements proper to be used in a given case has been determined, it frequently happens that the easiest way in which to supply that given concentration to the soil or other culture medium is to add the desired stimulating element or elements in the form of relatively insoluble compounds, the solubility of which compounds in the soil solution is such as to supply the desired element or elements in the desired concentration, it being thus impossible to furnish accidentally a concentration of the stimulating element or elements greater than that desired because such an accident is prevented by the low solubility of the compounds in which the stimulating element or elements have been added. It is agreed by agricultural experts that materials present in the soil affect plant nutrition only as they are soluble in the soil solution. Thus a compound containing, for instance, zinc will furnish zinc to the plant only in that concentration in which the compound is soluble in the soil solution. For instance, zinc might be added in the form of the mineral calamine, which is zinc silicate and which is relatively insoluble. By this means, zinc could be supplied to the plant only in that concentration in which calamine is soluble in the soil solution, which might be the exact, or nearly the exact, concentration of zinc needed in a given case.

In this connection, it is an important fact that some of the elements found to be stimulating occur, both in soluble and in insoluble forms, in certain metallurgical and other wastes now entirely without value. As instances, I may mention slags from copper and lead furnaces; sludges and waste liquors from hydrometallurgical plants and from refineries of borax; flue dusts from roasters and smelters; and fines, tailings and discharged slimes from cyanide and other mills, but I would not be understood as confining myself to the materials named. Any material now of no or little value and containing some one or more of the stimulating elements may be useful as a fertilizing substance under my invention.

I have discovered that the following elements are capable of acting as stimulating elements in the meaning of this invention: arsenic, boron, chromium, cobalt, copper, fluorine, iodine, iron, manganese, mercury, molybdenum, nickel, silver, tin, titanium, tungsten, uranium, vanadium and zinc. However, I would not be understood as confining my invention to these elements. I contemplate that my invention includes and applies to any element or elements not belonging to the class of known mineral plant nutrients and which is stimulating to plants at a certain concentration and toxic to plants at a certain higher concentration, these concentrations being variable with and determined by the nutritive conditions surrounding the given plant and especially with and by the concentrations of the nutrient elements potassium, phosphorous, nitrogen and calcium available to the plant.

For the purpose of the growth of grain crops, the soil must contain at least the following elements: potassium, phosphorus, nitrogen, calcium, magnesium, iron and sulphur. The medium of supply of these elements to the plant roots is the water contained in the soil, which water, together with the substances dissolved in it, forms the "soil solution." All of the elements above named, and such other elements as affect plants at all, do so according to the concentration of each of the given elements in the soil solution. Any one of the necessary or "nutrient" elements above named can be toxic to the roots of plants, if the soil solution contains a given element in too great concentration. In normal agricultural soils, however, the elements calcium, iron and sulphur, cannot attain a concentration high enough to become toxic, and the concentration of these elements in normal soils does not vary widely, even if additional amounts of these elements be added; this being for the reason that nearly insoluble compounds of these elements occur in the soil or are produced therein by reactions with other normal soil constituents, especially calcium and carbon dioxide. Normally, therefore, the amounts of these three elements present in the soil solution are limited by the solubilities of the nearly insoluble compounds referred to. This same circumstance may occur in the case of the other elements named, but does not always do so. Accordingly, the amounts of the other elements named, which amounts are present in the soil solution, may and do vary widely; and some of them, especially magnesium, may reach so high a concentration as to become toxic to plant roots.

It is well known that the effects of these necessary or nutrient elements on plant growth are determined not only by the total amounts of each and of all which are present in the soil solution, but also by what is known as the "balance" between them; this being their ratio each to the other. The knowledge of this connection, and indeed most of the knowledge now available concerning the relations of nutrient and other elements to the roots of plants, has been obtained by the growth of plants in aqueous solutions containing known amounts of the various nutrient or other compounds. This method is known as the method of "water culture," or culture in nutrient solutions. While data obtained by experiments in water culture require considerable modification in order to be applicable to plants grown in the soil (as is discussed more in detail below), the fundamental relations between the different nutrient and other salts are most conveniently determined by experiments in water culture, and accordingly the behavior of plants toward different elements and salts in water culture is generally accepted as the starting-point of such investigations and has been so used in the investigations from which this invention results.

As has been noted above, the relations of the nutrient and other elements to the plant involve not only the effect of the total concentration of salts in the nutrient solution, but also the balance or ratio of these nutrient elements.

From the considerable volume of published information, as well as from my own investigations, I am of the opinion that a proper balance for the growth of wheat plants is as follows, the figures set opposite the different elements referring to the proportion of each in a total 100. It must be noted that these figures do not represent the percentage of these elements in the nutrient solution, other elements being necessarily present in combination with these elements and also adventitiously present in other combinations not regarded as essential or important toward the plant. The figures given in the following table are intended merely to represent the mutual ratios, or balance, of these particular elements which are regarded as being necessary and important.

*Table #1.*

| | |
|---|---|
| Potassium | 40 |
| Phosphorus | 20 |
| Nitrogen | 25 |
| Calcium | 5 |
| Magnesium | 5 |
| Sulphur | 4 |
| Iron | 1 |

A solution in which the different elements concerned possess the balance given by the preceding table will be satisfactory for the growth of wheat plants, provided that the total concentration of all dissolved materials in this solution is also satisfactory for the growth of the plant roots. It is obvious that this total concentration may be varied considerably without varying greatly the balance above given. This may be accomplished by using different compounds of the various necessary elements in order to produce the balance given. As a result of all available information, including my own investigations, I am of the opinion that the most satisfactory total concentration of all dissolved substances in a nutrient solution of satisfactory balance is approximately five grams per liter. While a considerable variation above and below this concentration of five grams per liter is possible without great detriment to the plant, a solution below one gram per liter is usually not satisfactory unless frequently changed, and a solution above ten grams per liter may be regarded as dangerous.

In summation, therefore, of the conditions which are regarded as most satisfactory for the normal growth of the wheat plant, it may be said that these conditions require a solution containing approximately five grams per liter of total dissolved materials, and that the distribution of the nutrient elements composing the major portion of these dissolved materials is, in accordance, approximately with the balance given in Table #1 above. While this conclusion rests in part upon the investigations I have made, it rests also to a great extent upon published investigations of others and does not constitute in any way an essential element of the invention which it is desired to protect.

The next fact which requires consideration is that experience shows that the proper solution just defined does not necessarily or even usually produce the most rapid growth of the wheat plant. As a result of a number of converging lines of investigation and of biological evidence, I have come to the conclusion that the first effect of any toxic element or condition on a growing plant is to increase the rate of growth of the plant. It follows from this that if a toxic agent be applied to a plant in a concentration such as to show only the beginning of the toxic action without producing ultimate death or injury, the result will be an increased growth of the plant. Thus, obviously, the addition of a small quantity of magnesium to the properly balanced solution will increase the growth of the wheat plants. The addition of a slightly larger quantity of magnesium will cause injury and death. This same effect will be shown by other toxic elements. In general, therefore, the progressive addition of small quantities of many substances to a properly balanced solution in which plants are growing will result first in a stimulation of growth, and, second, in injury and death. The precise point at which stimulation will be produced and the precise point at which injury will occur are both determined by the concentration of the stimulant and toxic substances in the nutrient solution.

The practical problem, therefore, of increasing the rate of growth to its maximum in a nutrient solution resolves itself into the discovery of the particular concentration of a stimulant element such as, for instance, copper, which concentration in the nutrient solution will have the stimulant effect rather than the toxic effect. It has been found by experiment that in the balanced solution above referred to the concentration of copper equaling .0002 gram per liter is stimulating. This corresponds to .004 per cent of copper in the total dissolved substances present.

Practical application of the use of copper starts from this fact. It has been found, however, and this is the essential principle of the invention which it is desired to protect, that this definite stimulating concentration of copper varies as the composition of the nutrient solution is changed. There is a variation in the concentration of copper necessary to produce stimulation, both with changes in the total concentration of the total nutrient solution and with changes in the balance of the nutrient elements in it. Also these changes apply to conditions in water culture. There will be additional changes in the concentration of copper necessary to produce stimulation, as it is desired to apply these principles to growth in soil, instead of in water culture, and this correction will vary with the type of soil.

It is to be remembered, also, that this concentration of copper and its variation with the conditions stated apply only to the growth of wheat and similar grain crops, and may be different if other crops are to be grown. It is obvious, also, that the concentrations will not necessarily be the same for other stimulating elements, such as potassium, magnesium, calcium and boron. It is obvious that the practical applications of these methods will involve extreme complexities. However, the principles which control the matter having been discovered and worked out for a single element, it is possible to work out the necessary details for any other given element or set of conditions.

I will proceed to describe in detail the variations and corrections necessary for the single case under discussion, viz., the application of copper to the growth of wheat.

The first correction necessary to the established stimulant concentration is the correction for variation in the total concentration of the nutrient solution. It will be remembered that this total concentration for the normal balanced solution is five grams per liter. It has been determined by experiment that, as the concentration varies above and below this normal volume of five grams per liter, the concentration of copper necessary to produce the stimulant effect varies also, as set forth in the following table:

Table #2.

| Total concentration of nutrient solution, grams per liter. | Stimulating concentration of copper in grams per liter of nutrient solution. | Stimulating concentration of copper expressed as per cent of total concentration of nutrient solution. |
| --- | --- | --- |
| .5 | .00008 | .016 |
| 1.0 | .00010 | .010 |
| 2.0 | .00015 | .008 |
| 3.0 | .00020 | .007 |
| 4.0 | .00020 | .005 |
| 5.0 ("normal" solution) | .00020 | .004 |
| 6.0 | .00020 | .003 |
| 7.0 | .00020 | .003 |
| 8.0 | .00025 | .003 |
| 9.0 | .00035 | .004 |
| 10.0 | .00045 | .005 |

The second variation affecting the activity of a given concentration of copper is the variation of the balance of nutrients in the solution. In considering this balance as applied to practical conditions, calcium sulphate and iron may be ignored, inasmuch as they do not vary widely enough to produce important disturbances of the plant's relations. In the case of the other elements, there is also a considerable range of variation, through which range there is no important disturbance of the plant's relations. With decrease in the relative concentration of a given element, there is no disturbance until the proportion of this element becomes so small as to render it actually deficient for the needs of the plant. This seldom occurs in normal cultivated soils and accordingly may be neglected for present purposes. The only variation of balance which is important practically for the present purposes is a variation in the direction of increase in the relative proportion of a given one or more of the elements. I believe that the relative proportion of each of the four remaining elements which may be considered as marking the upper limits of proper balance are as follows:

Table #3.

| | |
| --- | --- |
| Potassium | 60 |
| Phosphorus | 50 |
| Nitrogen | 60 |
| Magnesium | 20 |

These figures refer, of course, to the same standard of calculation as is used in Table #1, representing the normal balance. When the figures given in Table #3 are exceeded in an actual case by any one of these four elements, the solution may be considered as seriously out of balance. Under these circumstances, there occurs in the solution exactly what happens when a toxic element is added, viz., first, a stimulation followed, if the departure from balance is sufficiently great, by a toxic effect. With such a nutrient solution, which is seriously out of balance, the addition of copper or any other stimulant and toxic element will have no stimulating effect, although it may have a toxic effect. Practically, therefore, the method of stimulant fertilization cannot be considered as applicable to a solution which is out of balance to the extent above described.

It is now necessary to discuss the application of the above principles to the growth of plants in the soil. In many ways the soil solution may be considered as an equivalent of the nutrient solution used in water culture. It is found, however, that the concentration of the various elements competent to produce given effects on plant roots are somewhat different in the soil and in water culture. These differences appear to be related to the mechanical composition of the soil and especially to the percentage of very fine particles which the soil contains. The mechanical composition of a soil is now generally expressed according to the system of the United States Bureau of Soils, now regarded as standard. The system is as follows:

Table #4.

| | Particles, in diameter. |
|---|---|
| Lime and gravel | 2.0 to 1.0 mm. |
| Coarse sand | 1.0 to .5 mm. |
| Medium sand | .5 to .25 mm. |
| Fine sand | .25 to .10 mm. |
| Very fine sand | .10 to .05 mm. |
| Silt | .05 to .005 mm. |
| Clay | Below .005 mm. |

When the mechanical composition of a soil is expressed in the form of percentages, by weight, of these various classes of particles which the soil contains, it is found that the effect of the soil on the critical concentration of stimulant or toxic elements is approximately proportional to the percentage of clay which the soil contains and is affected slightly by the percentage of silt. The larger particles have only a very slight effect, if any.

For practical purposes, an index representing the relative effect of soils upon the methods here under discussion may be obtained by adding to the percentage of clay one tenth of the percentage of silt. Thus, if a given soil contains ten per cent of silt and fifteen per cent of clay, the index is fifteen plus one tenth of ten, or one, giving sixteen per cent. Even in coarse soils containing no clay or silt whatsoever, there is a certain small effect upon the stimulant concentration, as established by experiments in water culture. This effect is always in the direction of an increase in the concentration necessary to produce stimulation. As the percentage of clay and silt in the soil increases with a corresponding increase in the index described in the last paragraph, this effect in the concentration necessary for stimulation becomes more marked. For the case under discussion, the increases are given in the following table:

Table # 5.

| Mechanical index of soil (as described). | Amount of copper necessary to produce stimulation— | | Correction factor to be applied to the amount of copper indicated for water culture and expressed as per cent of dissolved substances. |
|---|---|---|---|
| | Expressed as grams per liter of the soil solution. | Expressed as per cent of total dissolved substances in the solution. | |
| 0 (coarse soil) | .00025 | .005 | 1.25 |
| 5 | .00030 | .006 | 1.50 |
| 10 | .00030 | .006 | 1.50 |
| 15 | .00035 | .007 | 1.75 |
| 20 | .00035 | .007 | 1.75 |
| 30 | .00040 | .008 | 2.00 |
| 50 | .00045 | .009 | 2.25 |
| 70 | .00050 | .010 | 2.50 |
| 90 | .00050 | .010 | 2.50 |
| Nutrient solution (included for comparison) | .00020 | .004 | |

The concentrations and correction factors given in the preceding tables, provide all necessary information for the application of the stimulant effect of copper to wheat plants grown in a given soil. I assume a soil, the soil solution of which is found on chemical analysis to contain four grams per liter of total dissolved material. Chemical analysis of the soil solution shows the seven nutrient elements above named to be present in quantities which give the following balance:

Table #6.

| | |
|---|---|
| Potassium | 28 |
| Phosphorus | 30 |
| Nitrogen | 19 |
| Calcium | 8 |
| Magnesium | 3 |
| Sulphur | 10 |
| Iron | 2 |

The chemical analysis of the soil shows that it contains 12 per cent of silt and 16 per cent of clay.

The balance of nutrients in the soil solution as given by Table #6 shows that all of the elements are within the limits set down in Table #3. Accordingly, the soil is such that the stimulant effect of copper can be obtained with it. The total concentration of dissolved materials in the soil solution being four grams per liter, the proper amount of copper to produce stimulation in water culture is read from Table #1 as .0002 grams per liter, or .007 per cent of the total dissolved materials. Since the soil contains 12 per cent of silt and 16 per cent of clay, the index of the mechanical composition of the soil will be 16 plus 1.2, or 17.2. From Table #5 it is seen that this value lies midway between 15 and 20 and that for both 15 and 20 the correction factor is 1.75. Applying this correction factor to the value of .007 per cent, obtained from Table #1, I obtain a value of .012 per cent, which gives the per cent of copper necessary in the total dissolved materials in the soil solution in order to give the stimulant effect. Since the total of these dissolved materials is four grams per liter, the amount of copper necessary to produce the stimulant effect in the given soil solution is .012 per cent of 4, or .00048 grams per liter.

The preceding discussion indicates in exact detail the method of applying the invention to the use of copper in the stimulation of the growth of wheat. For any other case, it would be necessary to discover experimentally or otherwise the following data:

1. The normal balance and concentration of nutrients proper for the given plant.

2. The concentration of the given element necessary to produce stimulation in water culture with the given plant and the properly balanced solution of proper concentration.

3. The effect upon this normal stimulating concentration of variations in the balance, or the total concentration, of nutrients in the solution.

4. The variations in the concentrations as determined in water culture caused by the use of soil instead of water culture.

As a beginning of work with other elements, there have been determined experimentally the concentrations competent to produce stimulation of wheat plants in the balanced solution above described. The following table gives these concentrations, as expressed in grams per liter of solution, for certain elements with which experiments have been conducted:

*Table #7.*

| | |
|---|---|
| Arsenic | .0003 |
| Boron | .0015 |
| Lead | .0400 |
| Manganese | .0200 |
| Uranium | .0300 |
| Vanadium | .0030 |
| Zinc | .0150 |

Having thus described my invention, what I claim is:

1. The method of stimulating the growth of plants with a stimulating material of a character which used in excess with certain conditions of the soil causes it to become poisonous, consisting first in ascertaining the amount of nutrients contained in the soil solution, then ascertaining the balance or mutual ratio between the nutrients in the soil and the stimulant to be used to preclude a poisonous combination, and finally applying the amount of stimulating material thus determined to the soil.

2. The method of stimulating the growth of plants with a stimulating material of a character which used in excess with certain conditions of the soil causes it to become poisonous, consisting first in ascertaining the amount of nutrients contained in the soil solution, then ascertaining the balance or mutual ratio between the nutrients in the soil and the stimulant to be used to preclude a poisonous combination, and then adding to the soil the amount thus determined of a relatively insoluble stimulating compound having a solubility in the soil such as to ensure a stimulating effect.

In testimony whereof I hereunto affix my signature.

EDWARD ELWAY FREE.